(12) United States Patent
Gupta et al.

(10) Patent No.: US 8,688,166 B2
(45) Date of Patent: Apr. 1, 2014

(54) CALL ESTABLISHMENT IN HIGHLY CONGESTED NETWORK ENVIRONMENT

(75) Inventors: Vagish Gupta, Bangalore (IN); Satish V. Brahme, Lindenhurst, IL (US); Donald A. Dorsey, Vernon Hill, IL (US); Jason D. Christensen, Lake Geneva, WI (US)

(73) Assignee: Intel Corporation, Santa Clara, CA (US)

( * ) Notice: Subject to any disclaimer, the term of this patent is extended or adjusted under 35 U.S.C. 154(b) by 201 days.

(21) Appl. No.: 13/274,598

(22) Filed: Oct. 17, 2011

(65) Prior Publication Data

US 2013/0095879 A1    Apr. 18, 2013

(51) Int. Cl.
*H04B 7/00*    (2006.01)

(52) U.S. Cl.
USPC ............ 455/525; 455/435.2; 455/435.3; 455/438

(58) Field of Classification Search
USPC ........ 455/426.1, 432.1, 434–444, 525, 552.1; 370/331–334
See application file for complete search history.

(56) References Cited

U.S. PATENT DOCUMENTS

| 6,674,739 | B1 * | 1/2004 | Lee et al. .................. 370/342 |
| 6,917,602 | B2 * | 7/2005 | Toskala et al. ............. 370/335 |
| 6,996,062 | B1 * | 2/2006 | Freed et al. ................ 370/235 |
| 7,197,318 | B2 * | 3/2007 | Schwarz et al. ............ 455/453 |
| 2004/0081260 | A1 * | 4/2004 | Matsusaka .................. 375/340 |
| 2005/0097112 | A1 * | 5/2005 | Matsuda ...................... 707/100 |
| 2007/0015530 | A1 | 1/2007 | Ding et al. |
| 2008/0287127 | A1 * | 11/2008 | Wu et al. .................... 455/434 |
| 2009/0170498 | A1 | 7/2009 | Venkatasubramanian et al. |
| 2009/0181676 | A1 * | 7/2009 | Lee et al. .................... 455/436 |
| 2010/0093350 | A1 | 4/2010 | Wang et al. |
| 2010/0260148 | A1 * | 10/2010 | Huoviala et al. ........... 370/335 |
| 2010/0330921 | A1 * | 12/2010 | Kim et al. ................. 455/67.11 |
| 2011/0039552 | A1 * | 2/2011 | Narasimha et al. ........ 455/425 |

(Continued)

FOREIGN PATENT DOCUMENTS

| EP | 2114102 A2 | 11/2009 |
| GB | 2461780 A | 1/2010 |
| WO | 2011100540 A1 | 8/2011 |

OTHER PUBLICATIONS

Patent Cooperation Treaty, International Search Report and Written Opinion of the International Searching Authority for International Application No. PCT/US2012/057190, Jan. 28, 2013, 13 pages.

*Primary Examiner* — Dominic E Rego
(74) *Attorney, Agent, or Firm* — Schwabe, Williamson & Wyatt, P.C.

(57) ABSTRACT

A communication device establishes a connection in a congested wireless communications network environment by systematically reducing a probability of attempting to connect to a strongest, but overly-congested, cell. A transceiver of the communications device attempts at least one first Random Access Channel (RACH) procedure with a first cell that is currently designated as a serving cell. A RACH controller of the communications device detects a failure to successfully connect to the first cell via the at least one first RACH procedure, autonomously determines, based at least on a probability value, which is greater than 0% and less than 100%, whether to de-prioritize the first cell for a period of time, and, in response to determining to de-prioritize the first cell, reduces a priority value assigned at the UE to the first cell for cell selection/reselection, and assigns a selected time period during which the priority value remains reduced.

20 Claims, 5 Drawing Sheets

(56) References Cited

U.S. PATENT DOCUMENTS

| | | | |
|---|---|---|---|
| 2011/0058529 A1* | 3/2011 | Uemura | 370/331 |
| 2011/0081904 A1* | 4/2011 | Kuo | 455/425 |
| 2011/0196868 A1* | 8/2011 | Hans et al. | 707/737 |
| 2011/0250891 A1 | 10/2011 | Zou et al. | |
| 2011/0250892 A1* | 10/2011 | Gupta et al. | 455/437 |
| 2012/0207070 A1* | 8/2012 | Xu et al. | 370/311 |
| 2012/0257536 A1* | 10/2012 | Kholaif et al. | 370/254 |
| 2013/0242898 A1* | 9/2013 | Johansson et al. | 370/329 |

* cited by examiner

CALL ESTABLISHMENT IN HIGHLY CONGESTED NETWORK ENVIRONMENT

BACKGROUND

1. Technical Field

The present disclosure relates to communication devices, and more particularly to selection/reselection of a cell for attempting to connect in a congested cellular environment.

2. Description of the Related Art

Wireless communications systems are widely deployed to provide various types of communication such as voice, packet data, and so on. These systems may be based on code division multiple access (CDMA), time division multiple access (TDMA), frequency division multiple access (FDMA), or other multiple access techniques. Such systems can conform to standards such as Third-Generation Partnership Project 2 (3GPP2, or "cdma2000"), Third-Generation Partnership (3GPP, or "W-CDMA"), or Long Term Evolution (LTE). In the design of such communications systems, it is desirable to maximize the capacity, or the number of users the system can reliably support, given the available resources.

In a cellular communication system, a geographical region is divided into a number of cells served by base stations. The base stations are interconnected by a fixed network which can communicate data between the base stations as well as a core network. A mobile station or user equipment is served via a radio communication link from the base station or node of the cell within which the mobile station is camped on. Communication from a mobile station to a base station is known as the uplink, and communication from a base station to a mobile station is known as the downlink.

The Random Access Channel (RACH) is a contention-based channel for initial uplink transmission, i.e., from User Equipment (UE) to a base station. The RACH can be used for several purposes, such as to access the network, to request resources, to carry control information, to adjust the time offset of the uplink, to adjust the transmitted power, and to transmit small amounts of data; however, contention resolution is the key feature of the random access channel.

Many UEs can attempt to access a same base station simultaneously, leading to collisions. In some instances, too many users attempt to establish a connection to a same cell or base station using a RACH procedure or too few network interfaces for the cell or base station are available because too many users are already connected to the network. In these instances, the RACH procedures of the UE can fail repeatedly.

BRIEF DESCRIPTION OF THE DRAWINGS

The description of the illustrative embodiments is to be read in conjunction with the accompanying drawings, wherein.

DETAILED DESCRIPTION

In one embodiment, the present disclosure provides a method of establishing a connection in a congested cellular network environment. A User Equipment (UE) attempts at least one first Random Access Channel (RACH) procedure with a first cell that is currently designated as a serving cell for the UE. The UE detects a failure to successfully connect to the first cell via the at least one first RACH procedure. The UE autonomously determines, based at least on a probability value, which is greater than 0% and less than 100%, whether to de-prioritize the first cell for a period of time. In response to determining to de-prioritize the first cell, the UE reduces a priority value assigned at the UE to the first cell for cell selection/reselection and the UE assigns a randomly selected time period during which the priority value remains reduced.

In another embodiment, the present disclosure provides a communication device that establishes a connection in a congested cellular network environment. A transceiver of a UE attempts at least one first RACH procedure with a first cell that is currently designated as a serving cell for the UE. A RACH controller: detects a failure to successfully connect to the first cell via the at least one first RACH procedure; autonomously determines, based at least on a probability value, which is greater than 0% and less than 100%, whether to de-prioritize the first cell for a period of time; and, in response to determining to de-prioritize the first cell, reduces a priority value assigned at the UE to the first cell for cell selection/reselection, and assigns a randomly selected time period during which the priority value remains reduced.

The above as well as additional features and advantages of the present innovation will become apparent in the following detailed written description of a method and a communication device. De-prioritization is employed in selecting/reselecting a best cell in a highly congested environment such that only a subset of similarly situated Users Equipment (UEs) are likely to attempt a RACH procedure to a weaker cell. In particular, a load on a highly congested cell can be reduced by moving, for randomly selected de-prioritization periods, a random set of such UEs that experience one or more different RACH failures or rejections from the network due to a congested cell or Radio Access Technology (RAT). Thereby, a better possibility of a successful call is provided to the UE and a reduction in peak RACH congestion is realized by the highly congested cell.

In the following detailed description of exemplary embodiments of the innovation, specific exemplary embodiments in which the innovation may be practiced are described in sufficient detail to enable those skilled in the art to practice the innovation, and it is to be understood that other embodiments may be utilized and that logical, architectural, programmatic, mechanical, electrical and other changes may be made without departing from the spirit or scope of the present innovation. The following detailed description is, therefore, not to be taken in a limiting sense, and the scope of the present innovation is defined by the appended claims and equivalents thereof.

Within the descriptions of the figures, similar elements are provided similar names and reference numerals as those of the previous figure(s). Where a later figure utilizes the element in a different context or with different functionality, the element is provided a different leading numeral representative of the figure number. The specific numerals assigned to the elements are provided solely to aid in the description and not meant to imply any limitations (structural or functional or otherwise) on the described embodiment.

It is understood that the use of specific component, device and/or parameter names (such as those of the executing utility/logic described herein) are for example only and not meant to imply any limitations on the described embodiments. The presented embodiments may thus be implemented with different nomenclature/terminology utilized to describe the components, or devices or parameters herein, without limitation. Each term utilized herein is to be given its broadest interpretation given the context in which that terms is utilized.

As further described below, implementation of the functional features of the innovation is provided within processing devices/structures and involves use of a combination of hardware, firmware, as well as several software-level constructs (e.g., program code). The presented figures illustrate both hardware components and software components within example data processing.

Figure 1:
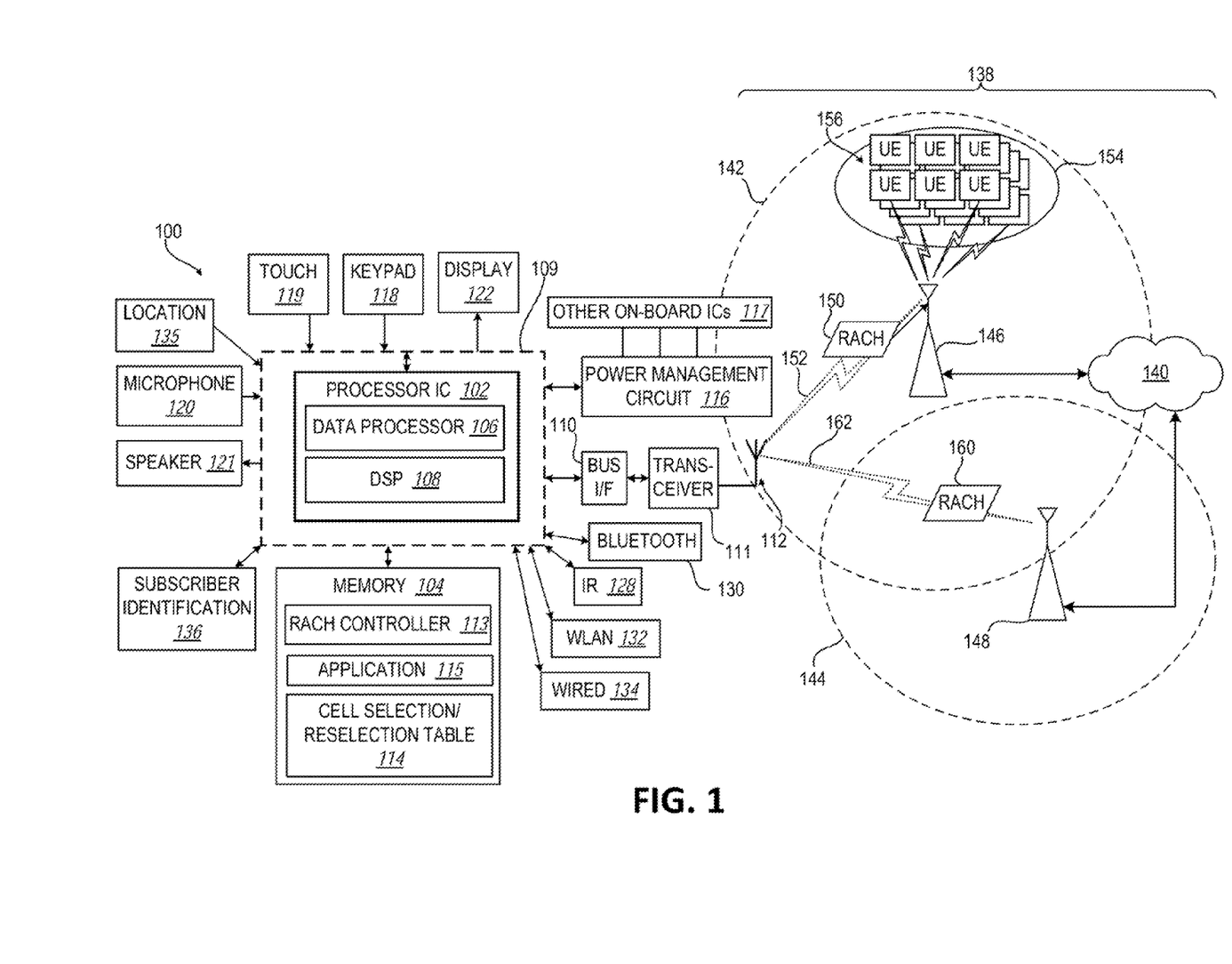
FIG. 1 provides a block diagram representation of an example portable communication device that operates within a congested network in accordance with an embodiment of the present invention.

With reference now to the figures, FIG. 1 is a block diagram of a wireless communication system in accordance with an embodiment of the present invention. The communication system includes one or more wireless communication devices 100, such as but not limited to a cellular telephone, a radio telephone, a smartphone, or a personal digital assistant (PDA), a laptop computer, personal computer, or tablet computer with radio frequency (RF) capabilities, in communication with a wireless communications network 138. In various technologies, wireless communication device 100 may be referred to as a user equipment (UE), a mobile station (MS), a subscriber station (SS), a subscriber unit (SU), an access terminal (AT), and so on and, for ease of reference, is also referred to herein as a UE. As illustrated by FIG. 1, UE 100 comprises a processor 102, such as one or more microprocessors, microcontrollers, digital signal processors (DSPs), combinations thereof or such other devices known to those having ordinary skill in the art. The particular operations/functions of processor 102, and thus of UE 100, is determined by an execution of software instructions and routines that are stored in a respective at least one memory device 104 associated with the processor, such as random access memory (RAM), dynamic random access memory (DRAM), and/or read only memory (ROM) or equivalents thereof, that store data and programs that may be executed by the corresponding processor. The processor 102 controls the communication and other functions and/or operations of communication device 100. These functions and/or operations include, but are not limited to, data processing and signal processing.

In this example, the UE 100 may be implemented with a bus architecture, represented generally by a bus 109. The bus 109 may include any number of interconnecting buses and bridges depending on the specific application of the UE 100 and the overall design constraints. The bus 109 links together various circuits including one or more processors, represented generally by the processor IC 102, and readable storage media, represented generally by at least one memory device 104. A bus interface 110 provides an interface between the bus 109 and a transceiver 111. The transceiver 111 provides a means for communicating with various other apparatuses over a transmission medium. In the exemplary embodiment, the transceiver 111 performs Radio Frequency (RF) cellular communication via one or more antennas 112.

Processor 102 is coupled to a power management circuit 116, which controls the allocation of electrical power to the various components of UE 100. Processor 102 receives electrical power via power management circuit 116, which couples to a power source, such as a battery or a charging circuit (not shown). Power management circuit 116 also provides electrical power to the various input, output and functional devices, described below, as well as other on-board integrated circuits 117.

UE 100 also comprises input devices, of which keypad 118, touch screen (or touch pad) 119 and microphone 120 are illustrated, connected to processor 102. Additionally, UE 100 comprises output devices, which are each connected to processor 102. Specifically, UE 100 in FIG. 1 comprises speaker 121 and display 122.

In addition to the transceiver 111, UE 100 may also include other components utilized to enable other forms of communication. For instance, several other data communication components may be provided within wireless communication devices such as UE 100 to enable a personal access network (PAN) or other capabilities. Among these components may be an infrared (IR) transceiver 128, a Bluetooth transceiver 130, a Wireless Local Access Network (WLAN) transceiver 132, and a wired communication module 134, which may be a universal serial bus (USB) connector that links UE 100 to another device via a USB or other serial cable.

The processor 102 is responsible for managing the bus 109 and general processing, including the execution of software stored on the memory 104. The software, when executed by the processor 102, causes UE 100 to perform various functions, some of which are described herein. The at least one memory device 104 may also be used for storing data that is manipulated by the processor 102 when executing software. In an exemplary embodiment, a RACH controller 113 in at least one memory device 104 selects or reselects a Radio Access Network (RAN) or Radio Access Technology (RAT) with reference to tracking data maintained in a cell select/reselect table 114 that is resident in at least one memory device 104. For instance, the RACH controller 113 can implement de-prioritization techniques in order to achieve a timely connection via the transceiver 111, on one or more service(s) supported by UE 100. Such a service can be performed for an application 115 that resides in at least one memory device 104 and is executed by processor 102. Alternatively to being wholly in memory 104, the RACH controller 113 can have a distributed design, such as being at least in part implemented in firmware or other dedicated circuitry (e.g., modules).

According to one embodiment, the UE 100 receives motion, proximity, triangulation, or geospatial coordinates data via one of the communication components of the UE or from a dedicated location sensor 135. From this data, UE 100 can determine whether the UE is stationary or moving, and thus whether a subsequent RACH procedure can continue to be directed to a congested cell. Alternatively or in addition, the data can indicate whether UE 100 is relatively stationary with regard to the current serving cell or best cell. For instance, UE 100 can be in public transportation conveyance with a femtocell that provides a cell for cellular communication. As another example, the UE 100 can be moving at pedestrian speeds and thus be relatively stationary.

Communication device 100 can comprise subscriber identification 136 for accessing one or more types of Radio Access Networks (RANs) or Core Networks. For example, UE 100 may be a global system for mobile communication (GSM) mobile phone and thus includes a Subscriber Identity Module (SIM) card that connects to processor 102 via a SIM adapter/port (not shown). The SIM card may be utilized as a storage device for storing data and the subscriber identification 136. Alternatively or in addition, the subscriber identification 136 may support other communication protocols or hardware architectures by including a virtual SIM, Removable User Identification Module (RUIM), Universal Integrated Circuit Card (UICC), etc. The subscriber identification 136 may also be stored within memory 104.

In addition to the above hardware components, several functions of UE 100 and specific features of the described embodiments may be provided as functional code and/or utility that is stored within memory 104 and executed by data processor 106 on processor 102. In one or more embodiments, the processor can execute various functional code (or firmware), such as RACH controller 113 by which UE 100 attempts to connect to cellular network 138, which for clarity is depicted as a combination of multiple cells 142, 144 (two shown) coupled to a core network 140.

FIG. 1 also illustrates two adjacent cells, a first cell 142 and a second cell 144, each of which is provided wireless service by a respective base station 146, 148 and each of which is in communication reach of UE 100. Until such time as a connection is required, UE 100 can camp on a best cell, such as the first cell 142, which then functions as a serving cell for the UE.

Periodically, a UE, such as UE 100, can perform an acquisition scan to determine what neighboring cells are of sufficient strength to be frequently monitored. The UE periodically monitors certain downlink channels of neighboring cells in order to determine signal strength of each cell for prioritizing a "best cell," a second best cell, and so on. The UE can also receive certain broadcast information and measure certain frequency and time offsets, etc., in order to expedite a handoff if necessary. The UE camps on the serving cell when not engaged in an active connection, periodically receiving pages from the serving cell and periodically making reports. While in this mode, the UE can conserve power by using discontinuous transmission and discontinuous reception. The UE can be entering service (e.g., moving from an area not served by a cell or powering up) and determining a best cell that is not yet a serving cell.

When a UE, such as UE 100, desires to attempt a connection with a base station of a serving cell, such as the base station 146 of the serving cell 142, in order to reach the cellular network 138, the UE can perform a Random Access Channel (RACH) procedure 150 on a first RACH 152 of the serving cell. RACH procedure 150 is used in mobile phones or other wireless devices, such as UE 100, when the wireless communication device needs to get the attention of a base station (e.g., base station 146) in order to initially synchronize transmission of the UE 100 with the base station. It should be appreciated with the benefit of the present disclosure that RACH procedure 150 can generally refer to a contention-based uplink channel.

In various instances, UE 100 may fail to reach the base station 146 by RACH procedure 150. For instance, other users' equipment (UEs), such as UEs 156, can contend via the RACH procedure for the attention of the base station 146. In particular, UE 100 and the other UEs 156 can be stationary for an extended period of time within a crowded location or venue 154 (e.g., a crowded sports stadium, a concert, etc.) being served primarily by the first cell 142.

Figure 2:
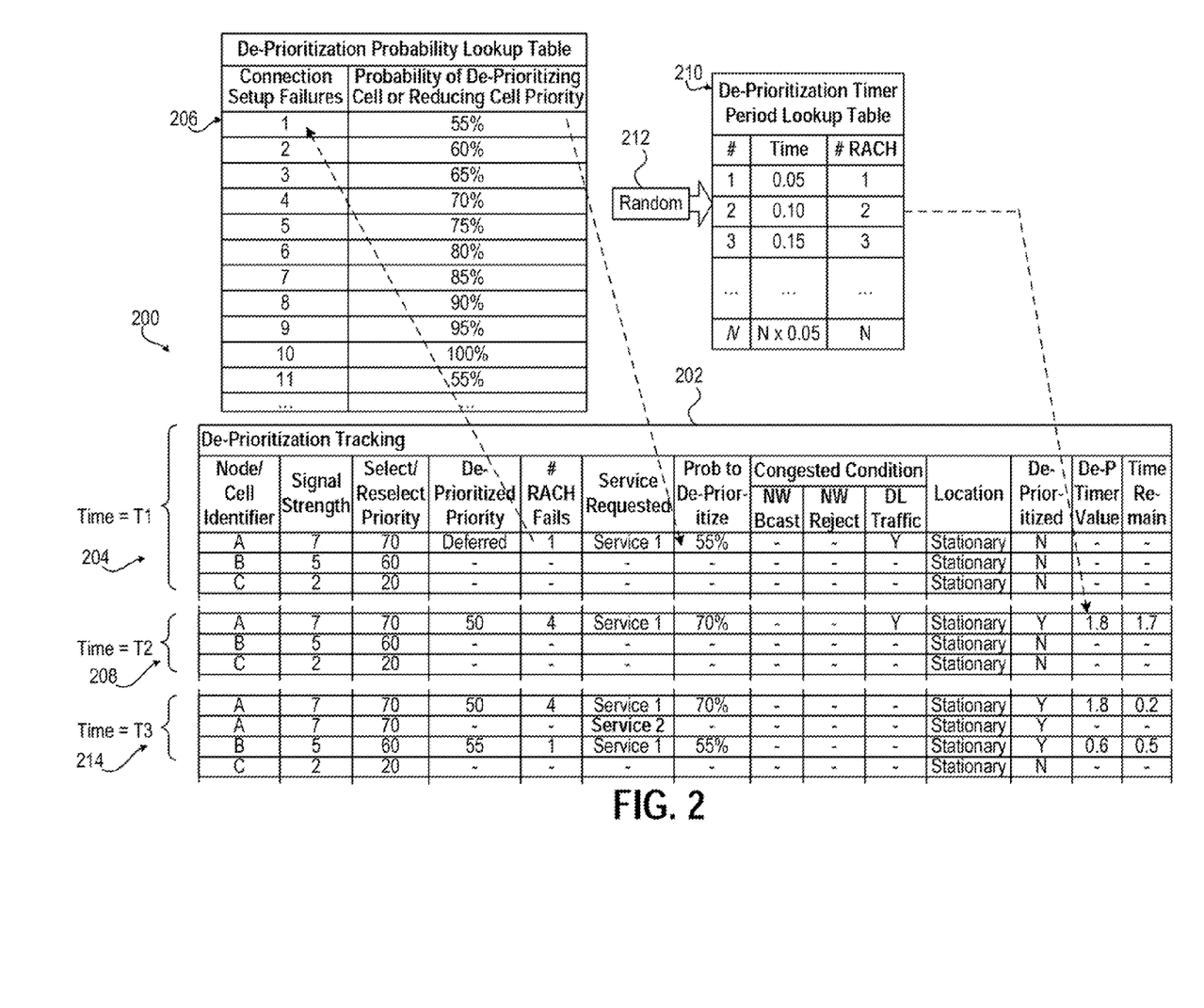
FIG. 2 provides a diagram representation of data structures for selecting/reselecting a cell in the congested network in accordance with an embodiment of the present invention.

In an exemplary embodiment, the transceiver 111 of UE 100, via RACH controller 113, attempts at least one first RACH procedure 150 with the first cell 142 that is currently serving as the serving cell for UE. RACH controller 113 detects a failure to successfully connect to the first cell 142 via the at least one first RACH procedure 150. Responsive to the failure, the RACH controller 113 autonomously determines, based at least on a probability value, whether to de-prioritize the first cell 142 for a period of time. In the described embodiments, the probability value is greater than 0% and less than 100%. In response to the RACH controller 113 determining to de-prioritize the first cell 142, the RACH controller 113 reduces a priority value assigned at UE 100 to the first cell 142 for cell selection/reselection, and the RACH controller 113 assigns a randomly selected time period during which the priority value remains reduced. De-prioritization of the first cell 142 results in a higher probability of selection of the second cell 144 for a subsequent RACH procedure 160 on a second RACH 162 of the second cell 144. Aspects of this de-prioritization scheme involve use of a cell selection/reselection table, which is illustrated by FIG. 2 and described hereafter.

As used herein, a "cellular network" is a system that includes one or more network-based communication devices that communicate with wireless user communication devices in the system and that manage communication between the communication devices. Cellular network 138 is depicted in a generalized manner. For example, cellular network 138 includes multiple base stations (BSs) 146, 148, such as but not limited to a Base Node (Node B), an evolved Base Node (eNB), an Access Point, or a Base Transceiver Station (BTS). Each base station (BS) 146, 148 provides wireless service to the UEs residing in a corresponding coverage area (e.g., cells 142, 144) of the BS 146, 148 via a corresponding air interface.

The above introduced cellular network 138 may be any type of communication system that implements voice or data communication services. For example, cellular network 138 may operate according to, but not limited to, any one or more of the OMA (Open Mobile Alliance), 3GPP (3rd Generation Partnership Project), 3GPP2 (3rd Generation Partnership Project 2), IEEE (Institute of Electrical and Electronics Engineers) 802.xx, European Telecommunications Standards Institute (ETSI), and WiMAX Forum standards.

The air interfaces can operate in accordance with the particular access technology supported by the corresponding BS. For example, the air interfaces may all utilize a same technology or they may utilize different access technologies. Moreover, each UE includes the capability to communicate with a BS through one or more wireless communication protocols such as Advanced Mobile Phone System (AMPS), Code division multiple access (CDMA), Time division multiple access (TDMA), Global System for Mobile communications (GSM), Integrated Digital Enhanced Network (IDEN), General Packet Radio Service (GPRS), Enhanced Data rates for GSM Evolution (EDGE), Universal Mobile Telecommunications System (UMTS), Wideband Code Division Multiple Access (WCDMA), Code division multiple access 6000 (CDMA6000), Long term evolution (LTE), evolved UMTS Terrestrial Radio Access Network (EUTRAN), and their variants.

Referring now to FIG. 2, an example data structure 200 is depicted that provides data for the RACH controller 113 to utilize as well as providing a means of tracking prior actions by the RACH controller 113. A de-prioritization and selection/reselection (DSR) table 202 is populated with node or cell identification ("A, B, C") for those cells detected as having sufficient strength for continued monitoring. The UE has an amount of time for tuning away from a serving cell in order to perform measurements of the neighboring cell with time resources generally prioritized by the relative strength of the cells. This monitoring expedites selection or reselection when the UE is inactive (i.e., no current connection for voice or data services) or facilitates a handoff when the UE is moving between cells. Determining which cell is the best or second best for connecting to and enabling the UE to perform a particular voice or data service can be based at least in part upon detected signal strength. For clarity, values are inserted in the DSR table 202 that are not scaled or given units of measure for any particular technology or protocol. In this instance, the signal strength is mapped to a default select/ reselect priority value. When a congested network is not detected, then selection or reselection is performed as conventionally understood and de-prioritization of a cell's assigned priority value is not appropriate.

De-prioritization selection/reselection table 202 includes records with the following fields or columns. A node/cell identifier field identifies a node or cell. For example, and for the purpose of illustrating the principles of the present invention, three cells are indicated within the example table, namely cells A, B, and C. A signal strength field contains measured signal strength or other similar value for each cell. A select/reselect priority field provides a priority that initially defaults to a value correlated to the signal strength of a cell or other associated and/or similar cell characteristics that are indicative of which cell should be selected for initiating a next connection request. A de-prioritized priority value field can be used to temporarily hold a substitute priority value for the select/reselect priority field when de-prioritization of the cell occurs and/or remains in effect. A number of RACH failures field is utilized to track a number of successive RACH failures for a particular node/cell. The tracking can be as a function of time, for example, since a last power up, since entering a particular node/cell, etc. A service requested field can indicate which one of a plurality of services can be offered by a particular node/cell or requested by the UE, so that congestion can be evaluated and resulting de-prioritization can be performed granularly on a per-service-basis within a single cell. A probability to de-prioritize field can be randomly or deterministically populated with a probability value that is used by a de-prioritization algorithm to weight the likelihood of de-prioritizing a cell prior to a subsequent RACH procedure. By utilizing the probability value within the algorithm, a likelihood is reduced that a group of UEs that are confronted with a same congested cell will all switch to a weaker node or cell at the same time. It is appreciated that absent this safeguard, as well as an additional safeguard related to random selection of a de-prioritized timer value, an automatic de-prioritization process may create a secondary problem of overwhelming a secondary cell.

In one embodiment, one or more congested conditions can be detected or received and reported as a pre-condition to performing de-prioritization. These detected or received congested conditions can also be used to affect a priority or a probability value. In an exemplary embodiment, three fields associated with congested condition indicators are depicted within data structure 200, namely a 'Network Broadcast' field, a 'Network Rejection of RACH procedure' field, and a 'Downlink Traffic' field. An additional enabling condition for de-prioritization is depicted as a 'Location' field, which indicates or can be processed to determine whether the UE is stationary, or relatively stationary. In one implementation of the described embodiments, the RACH controller 113 does not de-prioritize a cell's priority value unless the UE is relatively stationary within the cell location. Thus, a UE that is not stationary relative to the cells will not experience a de-prioritization due to a failed RACH. A de-prioritized field flags, that is, indicates, whether the base station or cell, or the base station or cell on a per service basis, is being de-prioritized. A de-prioritization timer value field can indicate what randomly selected time period was used for the de-prioritization. A time remaining field can indicate what portion of the de-prioritization time period remains. It is appreciated that the above fields are merely provided for illustration and are simply exemplary types of fields that can be included in such a data structure. Additional fields, less fields, and/or different types of fields can be utilized in any one implementation of the described embodiments. Also the data may be stored in different locations rather than being present within a single data structure 200.

The following description refers to the functional implementation and/or usage of the data structure during device operation in a three cell environment, with the serving cell identified as cell A (for example, cell 142). At time T1 as depicted at 204, a RACH procedure to obtain a first service, that is, Service 1, via cell A has failed. The failure itself can be used as an indication of a congested network. Alternatively or in addition, a congested condition may be detected. In this instance, neither network broadcast ("NW bcast") nor an explicit network rejection to the UE has confirmed a congested network for cell A. However, the UE has monitored downlink traffic and determined that the number of connections as a function of time is greater than a threshold, indicating network congestion.

In response to the RACH failure and/or the de-prioritization condition, the RACH controller 113 accesses a de-prioritization probability lookup table 206. By reference to the table, the RACH controller 113 determines a probability of de-prioritizing cell or reducing cell priority as a function of a number of connection setup failures. Using this probability, the RACH controller 113 determines that, in this instance, the next selection/reselection would be to the same cell, and the de-prioritized priority is indicated as "deferred." However, it is apparent that, using the probability, it is possible that the RACH controller 113 could have determined to de-prioritize at this first instance of a failure. It should be appreciated with the benefit of the present disclosure that a higher probability value corresponds to a higher likelihood of de-prioritization. For instance, a first failure mapped to a 55% probability is less likely to result in de-prioritization than the $6^{th}$ failure at 80% probability.

At a second time T2 as depicted at 208, the RACH controller 113 has tracked four failed RACH procedures to cell A and retrieves, from table 206, a probability of de-prioritizing of 70%, corresponding to four (4) RACH failures. The 70% probability is reflected within DSR table 202. RACH controller 113 executes the algorithm that randomly determines, correlated to the probability value, whether to de-prioritize the priority value (70) of the serving cell A. As indicated by the DSR table at T2 208, RACH controller 113 de-prioritizes the priority value of serving cell A from 70 to 50 after four (4) RACH failures. In an alternative embodiment, the de-prioritized priority value of the cell could be set to a very low value (e.g., 0) so that a de-prioritized cell will only be chosen as the serving cell if there are no other cells remaining that have not undergone de-prioritization. During subsequent RACH procedures, RACH controller 113 temporarily substitutes the de-prioritized value of 50 for cell A in determining which cell to select to complete the subsequent RACH. The de-prioritized value is temporarily substituted for the signal strength-based priority of 70 as shown, for instance. The RACH controller 113 also randomly selects a time for de-prioritizing the cell, that is, cell A, by selecting from within a de-prioritization timer period lookup table 210. In one embodiment, certain factors are utilized to shorten or lengthen the time before restoring the priority value of the de-prioritized cell, cell A, to its original value. For instance, the time period can be a random function 212 of selecting one time value of different time values between 10 seconds and 60 seconds. Alternatively, in another embodiment, the time value can be defined in terms of multiples of a period of time sufficient for a UE to complete one RACH procedure. Also at time T2 208, the RACH controller 113 selects a second best cell, that is, cell B (for example, cell 144), to connect to via the next or subsequent RACH procedure, as cell B now has a higher priority value of 60 than cell A's de-prioritized priority value of 50.

At a third time T3 as depicted at 214, the RACH controller 113 has detected one or more RACH procedure failures on the second cell, cell B, and has de-prioritized the second cell B after the first RACH failure. However, the second cell B still has a higher cell selection priority value, that is, 55, than the priority value of cell A, which remains at 50 until the time remaining field reduces to zero (0). As shown, the time remaining for removal of the de-prioritization status of cell A is 0.2 units of the original 1.8 units of time assigned. Thus, the next RACH request will again be handled by cell B. Notably, the presence of some time remaining, 0.5 units, for cell B does not affect the subsequent RACH request being handled by cell B since cell B still remains the higher priority cell for reselection.

As further illustrated at time T3, de-prioritization can be determined based on what service is being sought. A cell can provide certain voice and data and/or multimedia services that can experience congestion on a service-by-service basis. Such services can also be distinct based upon what Radio Access Technology (RAT) is required to use the service. The UE can choose to de-prioritize a best cell or a serving cell only for subsequent connection requests for the same first service (Service 1) based on RACH procedure failures and/or detected congested conditions affecting the first service. The UE can select or reselect the same best cell or serving cell for another second service (Service 2), regardless of the de-prioritization status of the best cell relative to the first service.

In an exemplary embodiment, UE 100 determines that the failure to successfully connect during the first RACH procedure was for initiating a first service, requested by the UE, of a plurality of different services that are supported by the first cell, including at least one different second service. As a specific example, the first service may be a voice service while the second service may be an SMS text service. UE 100 de-prioritizes the first cell with respect to completion of the first service, that is, the voice communication service. An identifier of the first cell is tagged with the first de-prioritized priority value, which causes the UE to initiate the at least one subsequent RACH procedure for the first service via a suitable second cell if one exists. The RACH procedure for the second service then can be completed via the first cell, regardless of the fact that the first cell has been de-prioritized relative to completion of a RACH for the first service. When the UE issues a subsequent RACH procedure for completion of the at least one different, second service via the first cell, each service of the plurality of different services, e.g., Services 1 and 2 at time T3, are individually assigned the first priority value as a default assignment of the serving cell and each different service that experiences a de-prioritizing condition associated with that specific service is subsequently assigned an individual de-prioritizing value for a selected time period in response to an occurrence of the de-prioritizing condition associated with that specific service.

Figure 3:
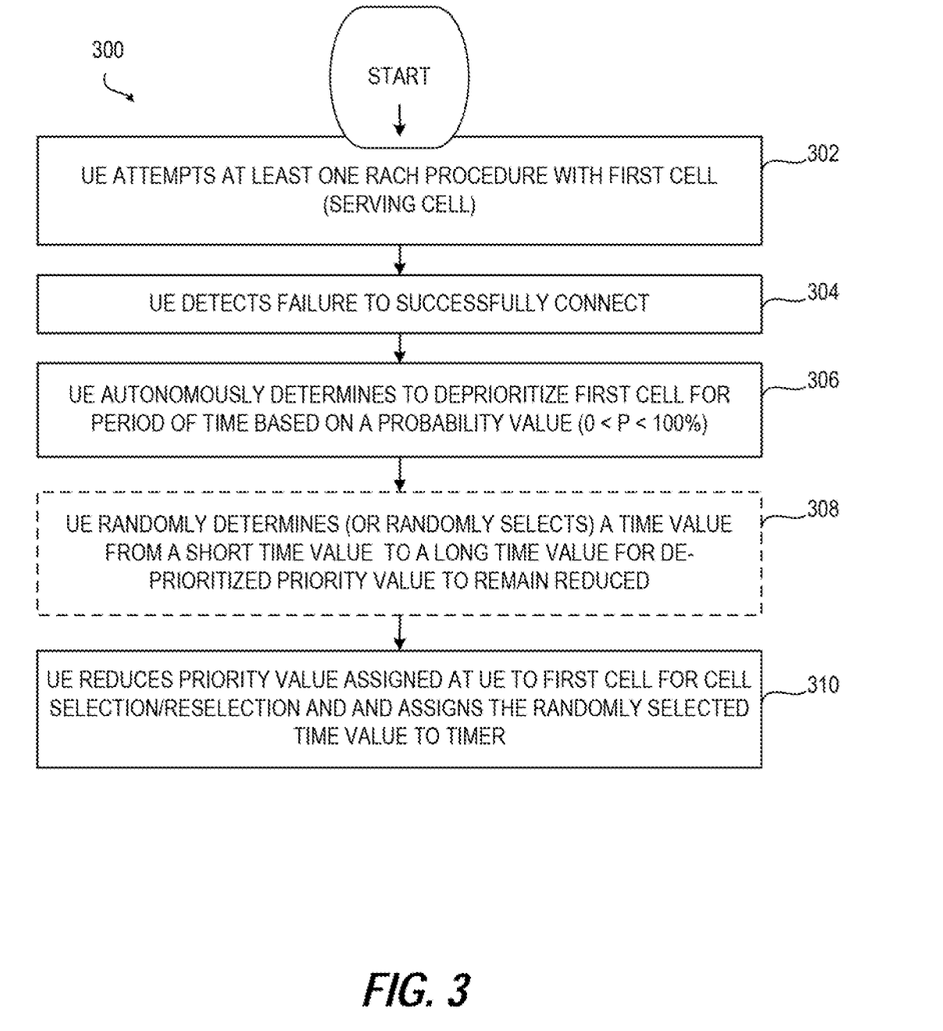
FIG. 3 provides a flow diagram of a method of de-prioritizing selection or reselection of a cell in a congested network environment in accordance with an embodiment of the present invention.

Referring now to FIG. 3, there is presented a flow diagram 300 illustrating a method by which a UE, such as UE 100, operates to establish a connection in a congested cellular network environment in accordance with an embodiment of the present invention. The UE attempts at least one first Random Access Channel (RACH) procedure with a first cell, such as cell 142, that is currently designated as a serving cell for the UE (block 302). The UE detects a failure to successfully connect to the first cell via the at least one first RACH procedure (block 304). The UE autonomously determines, based at least on a probability value, which is greater than 0% and less than 100%, whether to de-prioritize the first cell for a period of time (block 306).

In one embodiment, the UE assigns a randomly selected time period from among a range of available time periods, wherein the range of available time periods comprises at least a first, shorter time period during which at least one subsequent RACH procedure can be completed by the UE and a second, longer time period during which multiple subsequent RACH procedures can be completed by the UE (block 308). In response to determining to de-prioritize the first cell, the UE reduces a priority value assigned at the UE to the first cell for cell selection/reselection, and assigns a selected time period during which the priority value remains reduced (block 310).

Figure 4:
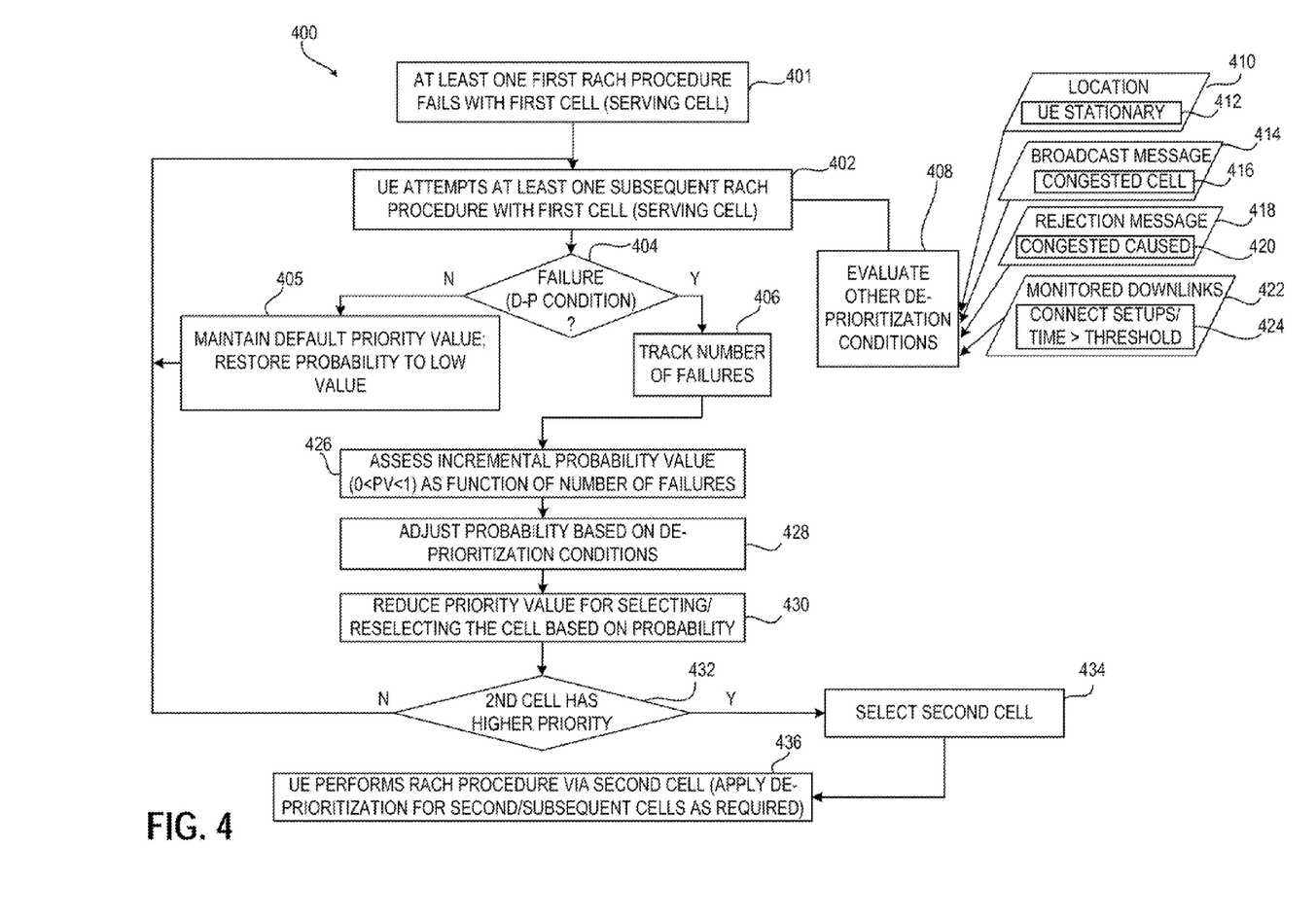
FIG. 4 provides a flow diagram of an exemplary method of de-prioritizing reselection of the cell after subsequent Radio Access Channel (RACH) failures in accordance with various embodiments of the present invention.

Referring now to FIG. 4, flow diagram 400 is provided illustrating various exemplary embodiments by which a UE, such as UE 100, may further balance efficient connection in a congested network environment over repeated RACH attempts. The UE experiences at least one first RACH failure with a first cell (block 401), such as cell 142, and attempts at least one subsequent RACH procedure with the first cell (block 402). In one implementation, the subsequent RACH procedure can be attempted with a second cell, such as cell 144, if the UE, and in particular a RACH controller of the UE, such as the RACH controller 113 of UE 100, elects to de-prioritize the first cell after the at least one first RACH failure. A determination is made whether the subsequent RACH procedure fails at the first cell (block 404).

If no failure is detected (and in one alternative embodiment no other de-prioritization condition is present), the UE continues to operate with the first cell as the serving cell. The RACH controller maintains the default priority value of the first cell (block 405). Also, if the probability value had been previously increased as a result of failure of the at least one first RACH procedure, the RACH controller restores the probability to a default low probability value. Similarly, if the probability value was previously increased due to the presence of a previous de-prioritizing condition, then the probability value is restored to a low probability value, approaching zero (0) probability (block 405). It should be noted as well that, in response to expiration of a time period following de-prioritizing of the first cell, the UE restores the priority value to a default priority value for the first cell and the UE automatically resets the probability value to a baseline low probability.

In a particular embodiment for the incremental probability adjustments described herein, in response to the failure of the subsequent RACH procedure, the UE tracks a number of failures to successfully connect to the first cell via the at least one first RACH procedure and each subsequent RACH procedure (block 406).

In one embodiment, the UE can evaluate one or more de-prioritization enabling conditions, including and/or in addition to the RACH failure (alternate block 408). In the exemplary embodiment of FIG. 4, a first de-prioritization enabling condition is depicted as location information 410, which indicates whether the UE is stationary (block 412). A second de-prioritization enabling condition is depicted as a broadcast message 414 that indicates whether the first cell is congested (block 416). A third de-prioritization enabling condition is depicted as a rejection message 418 from the network that indicates whether the first cell is congested (block 420). A fourth de-prioritization enabling condition is depicted as a monitored downlink 422 from the network that can be used to determine a number of connection setups over a period of time and whether the number exceed a threshold (block 424). It is however appreciated that in most embodiments, the tracked RACH failures can provide a sole basis for inferring network congestion. In one such de-prioritization conditions evaluation embodiment, the UE, at block 404, may performs the de-prioritization of the first cell only if at least one of a group of conditions is detected (see D-P Condition in block 404). The group of conditions comprises (a) a previously received broadcast message indicates that a congested cell condition exists, (b) the network responds to a request by the UE for a connection with a reject message containing a cause value which indicates that a congested cell condition exists, (c) a monitoring of the downlink channels indicates that the number of connection setups being performed by the network per unit time has exceeded a threshold, and (d) a monitoring of the downlink channels indicates that the network is transmitting to other UEs a reject message containing a cause value which indicates that a congested cell condition exists, wherein the number of such reject messages being transmitted to other UEs has exceeded a threshold.

In another such de-prioritization conditions evaluation embodiment, the UE may detect that the UE is in motion relative to a location at which the priority of the first cell could have been de-prioritized. The UE automatically resets the priority value of the first cell to a default priority value in response to detecting that the UE is in motion and that the priority value of the first cell is currently a de-prioritized value.

In various other embodiments of the present invention, satisfying one or more conditions can be required to begin de-prioritization. Alternatively or in addition, satisfying one or more conditions can also be required to continue a previously implemented de-prioritization. Alternatively or in addition, one or more conditions can affect a probability of de-prioritization. In the illustrative depiction, both uses of de-prioritization conditions are shown, both in determining whether to de-prioritize and in adjusting a probability for selection or reselection during de-prioritization.

Basing a probability of de-prioritization first on a number of failures provides an inference that congestion exists. Then the probability can be upwardly adjusted when a condition is detected that corroborates or confirms the congestion. The group of conditions comprises (a) a previously received broadcast message indicates that a congested cell condition exists, (b) the network responds to a request by the UE for a connection with a reject message containing a cause value which indicates that a congested cell condition exists, (c) a monitoring of the downlink channels indicates that the number of connection setups being performed by the network per unit time has exceeded a threshold, and (d) a monitoring of the downlink channels indicates that the network is transmitting to other UEs a reject message containing a cause value which indicates that a congested cell condition exists, and the number of such reject messages being transmitted to other UEs has exceeded a threshold. In one embodiment, the UE increases the probability value for de-prioritizing the first cell by increasing the probability value between more than 0% and less than 100%, with the increases directly co-related to a number of consecutive failures registered for consecutive RACH procedures. A higher probability value makes it more likely that the UE will de-prioritize the priority value of the first cell.

In one such embodiment, based upon the tracking of the failures (block 406), the UE increases the probability value for de-prioritizing the first cell in response to detecting that at least one failure has occurred during subsequent RACH procedures on the first cell. For instance, the UE can increase the probability value for de-prioritizing the first cell for each consecutive failure detected as previously described in FIG. 2, wherein the probability value increases from a baseline low probability to a high probability in 'N' number of increments based on the number of RACH failures (block 426).

Alternatively or in addition to adjusting probability based on the number of failures, the UE can adjust the probability value for de-prioritizing the first cell as a function of whether one or more of a group of other de-prioritizing conditions is detected (block 428). Based upon the current probability value, the UE probabilistically determines to reduce the priority value utilized to select or reselect the cell for future connection requests (block 430).

The UE determines whether a second cell has a higher priority than the de-prioritized first cell (block 432). If not, the UE attempts a subsequent RACH procedure with the first cell (block 402). In yet an another embodiment, the UE reduces the priority value assigned at the UE to the first cell for cell selection/reselection to ensure that the UE does not select the first cell during a subsequent RACH procedure when at least one suitable second cell is also present with a default priority. If one suitable second cell exists with a higher priority, then the UE selects the second cell (block 434). The UE then performs the subsequent RACH procedure with the second cell and the UE applies the same de-prioritization algorithm for failures to connect to the second cell as described above for the first cell (block 436).

In still another embodiment, in response to de-prioritizing the first cell, the UE initiates a subsequent RACH procedure, during a period of time before expiration of the selected time, to one or more selected second cells. As described herein, the second cells are selected based in part on the priority value of the particular cell relative to the de-prioritized value of the first cell.

In a particular embodiment, the UE attempts at least one subsequent RACH procedure with the at least one suitable second cell. In response to detecting a failure to successfully connect to the at least one suitable second cell via the at least one subsequent RACH procedure, the UE autonomously determines, based at least on a second probability value, which is greater than 0% and less than 100%, whether to de-prioritize the at least one suitable second cell for a second time period. In response to determining to de-prioritize the at least one suitable second cell, UE reduces a second priority value assigned at the UE to the at least one suitable second cell for cell selection/reselection, and the UE assigns a randomly selected second time period during which the second priority value remains reduced.

Figure 5:
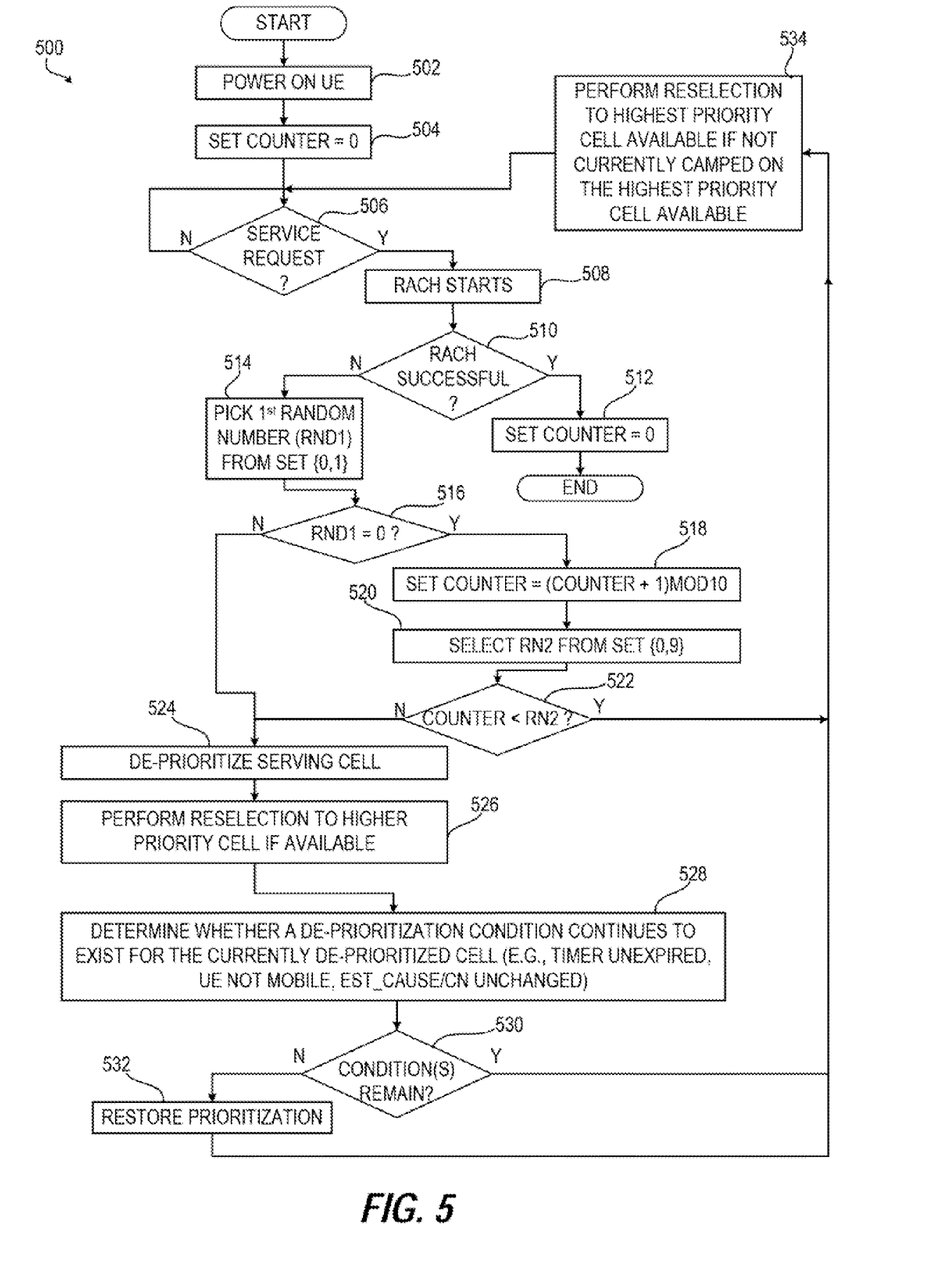
FIG. 5 provides a flow diagram of another exemplary method of de-prioritizing selection or reselection of the cell using a probabilistic calculation in accordance with an embodiment of the present invention.

Referring now to FIG. 5, a flow diagram 500 is provided that illustrates a method by which a UE, such as UE 100, may establish a connection in a congested cellular network environment in accordance with still other embodiments of the present invention. The flow diagram 500 begins with power being provided to the UE (block 502). The UE sets a counter to 0 (block 504). The UE determines whether a service request is detected (block 506). If a service request is detected, then the UE starts the RACH procedure (block 508). The UE then determines whether the RACH procedure is successful (block 510). If the RACH procedure is successful, the UE sets the counter to zero (block 512) and the flow diagram 500 ends. However, if the RACH procedure is unsuccessful, in block 510, then the UE selects a first random number from a set of {0,1} (block 514). The UE determines whether the first random number, RND1, is '0' (block 516). If RND1 equals '0,' the UE sets the counter equal to (counter +1)MOD 10 (block 518). The UE then selects a second random number, RND2, from a set {0 . . . 9} (block 520). Then the UE determines whether the counter is less than the second random number (block 522). If the counter is not less than RND2, or if the first random number was determined to be one (1) in block 516, then the UE de-prioritizes a serving cell, such as cell 142 (block 524) and performs selection/reselection to a higher priority cell, such as cell 144, if a higher priority cell is available (block 526).

The UE then may determine whether continued de-prioritization is warranted based upon the continuation of one or more de-prioritization conditions. Specifically the UE determines whether a de-prioritization condition continues to exist for a currently de-prioritized cell, such as de-prioritized cell 142 (block 528). In the illustrative embodiment, continued de-prioritization is warranted when one of a plurality of de-prioritization conditions continues to exist following the initial de-prioritization. Among these continuing de-prioritization conditions are: (a) the timer has not yet expired, (b) the UE is not currently mobile, and/or (c) a desired service/core network is unchanged from a previous attempt. An occurrence of an expired timer, a detected movement of the UE, and/or a change in the desired service network, may trigger a reset of the UE parameters, including at least the priority value and the probability value. Thus, a determination is made as to whether any of the applicable de-prioritization condition(s) remain (block 530). If none of the conditions remain, the UE restores, for the de-prioritized cell, an original priority for selection or reselection of the cell (block 532), and the method moves to block 534 at which the UE performs reselection to the highest priority cell available. The reselection to the highest priority cell available is performed by the UE only if the cell on which the UE is currently camped is not the highest priority cell available. However, if the de-prioritization conditions associated with the de-prioritized cell continue to persist, as determined at block 530, then the UE performs a next RACH and subsequent RACHs utilizing reselection based on the highest priority cell that is available (block 534). Returning to block 522, if the counter is not less than the second random number, then no de-prioritization of the current serving cell is triggered and the method proceeds to block 534.

By virtue of the foregoing, it should be appreciated that adjusting a probability of selecting or reselecting a cell for a RACH procedure ultimately mitigates the congestion due to too numerous RACH attempts within a single cell on a network. Also, by staggering and/or randomizing the process for determining when to de-prioritize a serving cell following one or more RACH failures, a mechanism is provided by which multiple UEs within a same serving cell may each attempt to connect via a second cell at a different time, thus increasing the likelihood that the UEs will eventually connect via either the first cell or the second cell, without all of the UEs collectively, automatically, migrating to the second cell following a single RACH failure.

The previously-described embodiments can provide a trade-off among an amount of time required for a UE to connect, a congestion on particular cell, and an interference to the network. In de-prioritizing a cell, typically the second cell selected will be at a greater distance or otherwise be subject to greater channel fading. Thus, the UE and the second cell may be required to transmit at a greater transmit power in order to successfully complete the RACH procedure. Thus, greater interference might be experienced by the first cell and other UEs. By introducing a probability of de-prioritizing and other optimizations, the number of UEs that select one or more second cells can be balanced against an amount of network interference that might result from such a selection. Thereby, a secondary problem is avoided or mitigated wherein an increased transmit power necessary to reach the weaker cell creates interference to other UEs and the best cell.

In each of the flow charts above, one or more of the methods may be embodied in a computer readable storage medium containing computer readable code such that a series of steps are performed when the computer readable code is executed on a computing device. In some implementations, certain steps of the methods are combined, performed simultaneously or in a different order, or perhaps omitted, without deviating from the spirit and scope of the innovation. Thus, while the method steps are described and illustrated in a particular sequence, use of a specific sequence of steps is not meant to imply any limitations on the innovation. Changes may be made with regards to the sequence of steps without departing from the spirit or scope of the present innovation. Use of a particular sequence is therefore, not to be taken in a limiting sense, and the scope of the present innovation is defined only by the appended claims.

As will be appreciated by one skilled in the art, embodiments of the present innovation may be embodied as a system, method or computer program product. Accordingly, embodiments of the present innovation may take the form of an entirely hardware embodiment, an entirely software embodiment (including firmware, resident software, micro-code, etc.) or an embodiment combining software and hardware embodiments that may all generally be referred to herein as a "circuit," "module" or "system." Furthermore, embodiments of the present innovation may take the form of a computer program product embodied in one or more computer readable storage medium(s) having computer readable program code embodied thereon.

Program code embodied on a computer readable storage medium may be transmitted using any appropriate medium, including but not limited to wireless, wireline, optical fiber cable, R.F, etc., or any suitable combination of the foregoing. Computer program code for carrying out operations for embodiments of the present innovation may be written in any combination of one or more programming languages, including an object oriented programming language such as Java, Smalltalk, C++ or the like and conventional procedural programming languages, such as the "C" programming language or assembly level programming or similar programming languages.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While the innovation has been described with reference to exemplary embodiments, it will be understood by those skilled in the art that various changes may be made and equivalents may be substituted for elements thereof without departing from the scope of the innovation. In addition, many modifications may be made to adapt a particular system, device or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description, but is not intended to be exhaustive or limited to the innovation in the form disclosed. Many modifications and variations will be apparent to those of ordinary skill in the art without departing from the scope and spirit of the innovation. The embodiment was chosen and described in order to best explain the principles of the innovation and the practical application, and to enable others of ordinary skill in the art to understand the innovation for various embodiments with various modifications as are suited to the particular use contemplated.

What is claimed is:

1. A method of establishing a connection in a congested wireless communications network environment, the method comprising:
   attempting, by a user equipment (UE), at least one first Random Access Channel (RACH) procedure with a first cell that is currently designated as a serving cell for the UE;
   detecting a failure to successfully connect to the first cell via the at least one first RACH procedure;
   autonomously determining, based at least on a probability value, which is greater than 0% and less than 100%, whether to de-prioritize the first cell for a period of time; and
   in response to determining to de-prioritize the first cell, reducing a priority value assigned at the UE to the first cell for cell selection/reselection, and assigning a selected time period during which the priority value remains reduced.

2. The method of claim 1, wherein in response to detecting that at least one failure has occurred during subsequent RACH procedures on the first cell, increasing the probability value for de-prioritizing the first cell.

3. The method of claim 2, wherein the increasing of the probability value for de-prioritizing the first cell is only performed if at least one of a group of conditions is detected, the group of conditions comprising:
   a previously received broadcast message indicates that a congested cell condition exists;
   the wireless communications network responds to a request by the UE for a connection with a reject message containing a cause value which indicates that a congested cell condition exists;
   a monitoring of the downlink channels indicates that the number of connection setups being performed by the network per unit time has exceeded a threshold; and
   a monitoring of the downlink channels indicates that the network is transmitting to other UEs a reject message containing a cause value which indicates that a congested cell condition exists, wherein the number of such reject messages being transmitted to other users equipment has exceeded a threshold.

4. The method of claim 2, wherein increasing the probability value for de-prioritizing the first cell comprises increasing the probability value within a range up to 100 percent, directly co-related to a number of consecutive failures registered for consecutive RACH procedures, wherein a higher probability value makes it more likely that the UE will de-prioritize the priority value of the first cell.

5. The method of claim 1, wherein assigning a selected time period comprises randomly selecting a first time period from among a range of available time periods, wherein the range of available time periods comprises at least a shorter time period during which at least one subsequent RACH procedure can be completed by the UE and a longer time period during which multiple subsequent RACH procedures can be completed by the UE.

6. The method of claim 1, further comprising:
   tracking a number of failures to successfully connect to the first cell via the at least one first RACH procedure; and
   for each consecutive failure detected, increasing the probability value for de-prioritizing the first cell, wherein the probability value increases from a baseline low probability to a high probability in N number of increments.

7. The method of claim 6, further comprising:
   in response to expiration of the time period following de-prioritizing of the first cell: returning the priority value to a default priority value for the first cell; and resetting the probability value to a baseline low probability.

8. The method of claim 1, wherein the de-prioritization of the first cell is only performed if at least one of a group of conditions is detected, the group of conditions comprising:
   a previously received broadcast message indicates that a congested cell condition exists;
   the network responds to a request by the UE for a connection with a reject message containing a cause value which indicates that a congested cell condition exists;
   a monitoring of the downlink channels indicates that the number of connection setups being performed by the network per unit time has exceeded a threshold; and a monitoring of the downlink channels indicates that the network is transmitting to other UEs a reject message containing a cause value which indicates that a congested cell condition exists, wherein the number of such reject messages being transmitted to other users equipment has exceeded a threshold.

9. The method of claim 1, further comprising:
detecting that the UE is in motion relative to a location at which the priority of the first cell could have been de-prioritized;
in response to detecting that the UE is in motion, returning the probability value to a baseline low probability; and
in response to detecting that the UE is in motion and that the priority value of the first cell is currently a de-prioritized value, automatically resetting the priority value of the first cell to a default priority value.

10. The method of claim 1, wherein reducing the priority value assigned at the UE to the first cell for cell selection/reselection ensures that the UE does not select the first cell during a subsequent RACH procedure when at least one suitable second cell is also present with a default priority.

11. The method of claim 10, further comprising:
attempting, by the UE, at least one subsequent RACH procedure with the at least one suitable second cell;
detecting a failure to successfully connect to the at least one suitable second cell via the at least one subsequent RACH procedure;
autonomously determining, based at least on a second probability value, which is greater than 0% and less than 100%, whether to de-prioritize the at least one suitable second cell for a second time period; and
in response to determining to de-prioritize the at least one suitable second cell, reducing a second priority value assigned at the UE to the at least one suitable second cell for cell selection/reselection, and assigning a selected second time period during which the second priority value remains reduced.

12. The method of claim 1, further comprising in response to de-prioritizing the first cell, initiating a subsequent RACH procedure, during a period of time before expiration of the selected time, to one or more selected cells, which cells are selected based in part on the priority value of the particular cell relative to the de-prioritized value of the first cell.

13. The method of claim 1, further comprising:
determining that the failure to successfully connect during the first RACH procedure was for initiating a first service, requested by the UE, of a plurality of different services that are supported by the first cell, including at least one different second service; and
de-prioritizing the first cell with respect to completion of the first service, wherein an identifier of the first cell is tagged with the first de-prioritized priority value, which causes the UE to initiate the at least one subsequent RACH procedure for the first service via a suitable second cell, while the UE issues a subsequent RACH procedure for completion of the at least one different, second service via the first cell, wherein each service of the plurality of different services are individually assigned the first priority value as a default assignment of the serving cell and each different service that experiences a de-prioritizing condition associated with that specific service is subsequently assigned an individual de-prioritizing value for a selected time period in response to an occurrence of the de-prioritizing condition associated with that specific service.

14. A communication device that is capable of establishing a connection in a congested wireless communications network environment, the communication device comprising:
a transceiver that is configured to attempt at least one first Random Access Channel (RACH) procedure with a first cell that is currently designated as a serving cell for the communication device; and
a RACH controller that is configured to detect a failure to successfully connect to the first cell via the at least one first RACH procedure, autonomously determine, based at least on a probability value, which is greater than 0% and less than 100%, whether to de-prioritize the first cell for a period of time, in response to determining to de-prioritize the first cell, reduce a priority value assigned at the communication device to the first cell for cell selection/reselection, and assign a selected time period during which the priority value remains reduced.

15. The communication device of claim 14, wherein the RACH controller is configured to, in response to detecting that at least one failure has occurred during subsequent RACH procedures on the first cell, increase the probability value for de-prioritizing the first cell.

16. The communication device of claim 15, wherein the RACH controller is configured to increase the probability value for de-prioritizing the first cell if at least one of a group of conditions is detected, the group of conditions comprising:
a previously received broadcast message indicates that a congested cell condition exists,
the wireless communications network responds to a request by the communication device for a connection with a reject message containing a cause value which indicates that a congested cell condition exists,
a monitoring of the downlink channels indicates that the number of connection setups being performed by the wireless communications network per unit time has exceeded a threshold, and
a monitoring of the downlink channels indicates that the network is transmitting to other communication devices a reject message containing a cause value which indicates that a congested cell condition exists, wherein the number of such reject messages being transmitted to other users equipment has exceeded a threshold.

17. The communication device of claim 15, wherein the RACH controller is configured to increase the probability value for de-prioritizing the first cell by increasing the probability value within a range up to 100 percent, directly co-related to a number of consecutive failures registered for consecutive RACH procedures, wherein a higher probability value makes it more likely that the communication device will de-prioritize the priority value of the first cell.

18. The communication device of claim 14, wherein the RACH controller is configured to assign a selected time period by randomly selecting a first time period from among a range of available time periods, wherein the range of available time periods comprises at least a shorter time period during which at least one subsequent RACH procedure can be completed by the communication device and a longer time period during which multiple subsequent RACH procedures can be completed by the communication device.

19. The communication device of claim 14, wherein the RACH controller is configured to track a number of failures to successfully connect to the first cell via the at least one first RACH procedure, and for each consecutive failure detected, increase the probability value for de-prioritizing the first cell, wherein the probability value increases from a baseline low probability to a high probability in N number of increments.

20. The communication device of claim 19, wherein the RACH controller is configured to, in response to expiration of the time period following de-prioritizing of the first cell, return the priority value to a default priority value for the first cell and reset the probability value to a baseline low probability.

* * * * *